Patented Apr. 1, 1952

2,591,573

UNITED STATES PATENT OFFICE 2,591,573

RESINOUS INSOLUBLE REACTION PRODUCTS OF TERTIARY AMINES WITH HALOALKYLATED VINYL AROMATIC HYDROCARBON COPOLYMERS

Charles H. McBurney, Philadelphia, Pa., assignor to Rohm & Haas Company, Philadelphia, Pa., a corporation of Delaware No Drawing. Application July 5, 1947, Serial No. 759,308

27 Claims. (Cl. 260—88.1)

This invention relates to anion-exchange resins and to their preparation and use. It relates to nitrogenous resins which are insoluble in aqueous solutions of acids, bases and salts and which are particularly suitable for the repeated removal of anions from fluids.

The resins of this invention are the reaction products of a tertiary amine and an insoluble, cross-linked copolymer of an aromatic monovinyl hydrocarbon and an aromatic divinyl hydrocarbon, which copolymer contains haloalkyl groups having the formula —$C_nH_{2n}X$ in which X is a chlorine or bromine atom and —$C_nH_{2n}$ is an alkylene group in which $n$ is an integer from one to four. The resins are, therefore, insoluble, aromatic, cross-linked vinyl copolymers containing substituent groups having the general formula

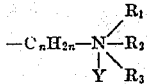

in which $n$ is an integer of value one to four; $R_1$, $R_2$, and $R_3$ are hydrocarbon groups; and Y is an anion, such as a chloride, sulfate or hydroxyl ion.

In the preferred process, resins of the above type are readily prepared by a series of well-defined steps. An insoluble hydrocarbon copolymer is first prepared by copolymerizing a monovinyl hydrocarbon such as styrene or vinyl naphthalene and a divinyl hydrocarbon such as divinyl benzene. Haloalkyl groups are next introduced into the insoluble copolymer by reacting the insoluble copolymer, in the form of small particles, with haloalkylating agents such as a mixture of an aldehyde and a halogen acid (e. g., paraformaldehyde and hydrochloric acid) or a dihaloalkane and a Friedel-Crafts catalyst (e. g., ethylene dichloride and aluminum chloride) or a haloether and aluminum chloride as exemplified below. The resultant haloalkylated copolymer is then reacted with a tertiary amine whereby there is obtained an insoluble, cross-linked, polymeric, quaternary ammonium salt. A final washing with an hydroxide of an alkali metal converts the quaternary ammonium salt to a quarternary ammonium hydroxide.

The final product, an insoluble, polymeric, quaternary ammonium hydroxide, is extremely basic; i. e., of the order of sodium hydroxide. When used in the treatment of acidic liquids and gases, the resin exchanges its hydroxyl groups for the anions present in the fluid with the result that the acidity of the fluid is removed and the quaternary ammonium hydroxide is converted to a salt.

In the first step which involves the preparation of the hydrocarbon copolymer, a monovinyl hydrocarbon is polymerized together with a divinyl hydrocarbon. That is, an aromatic hydrocarbon containing one vinyl substituent is copolymerized with an aromatic hydrocarbon containing two vinyl substituents. Hydrocarbons of the first class are typified by the following: Styrene, ortho-, meta-, and para-methyl styrenes, ortho-, meta-, and para-ethyl styrenes, vinyl naphthalene, vinyl anthracene, and the homologues of the above. While divinyl benzene is the divinyl hydrocarbon of first choice, others which are operable include divinyl toluenes, divinyl naphthalenes, divinyl ethyl benzenes, and divinyl xylenes.

In preparing the copolymers a predominant amount, on a molar basis, of the monovinyl hydrocarbon is employed. That is, more than half of the total number of moles of hydrocarbon employed are those of the monovinyl hydrocarbon. It is preferred that the monovinyl hydrocarbon constitute from 60 to 99.9%, on a molar basis, of the mixture of vinyl hydrocarbons. That is to say, it is preferred that the amount of the divinyl hydrocarbon constitute 0.1% to 40% of the mixture on a molar basis. The latter is a cross-linking agent which imparts insolubility, complexity, and hardness to the copolymer. It has been shown that the use of even less than 0.1% of the cross-linking agent will result in a copolymer which is insoluble in organic liquids, although it may swell in some organic liquids. As the amount of cross-linking divinyl hydrocarbon is increased, the resultant product becomes increasingly dense and correspondingly difficult to haloalkylate. Copolymers of a cross-linking divinyl hydrocarbon and a mixture of two or more monovinyl hydrocarbons are included within the scope of this invention. Such combinations are typified by the following: Styrene, ethyl vinyl benzene and divinyl benzene; styrene, vinyl naphthalene and divinyl benzene; m-methyl styrene, styrene and divinyl benzene; styrene and divinyl benzene.

The insoluble copolymers of the aromatic mono- and di-vinyl hydrocarbons may be prepared by a variety of well-known methods. Thus, the monomers may be mixed and then polymerized en masse or they may be emulsified or otherwise suspended in a liquid medium and then polymerized. Emulsion- and suspension-polymerization, in which the monomers are first suspended in a non-solvent for the monomers such as water or brine solution and are then heated, agitated, and copolymerized, are much preferred because these methods yield hard copolymers in the form of small spheroids, globules, or "beads"; and the size of such particles can be regulated and controlled. Thus, particles ranging in size from 5 to 325 mesh may be prepared. The extremely fine particles of approximately 40 to 150 microns in diameter are particularly useful in certain new ion-adsorbing techniques. Furthermore, very fine or porous particles may be haloalkylated and ultimately aminated more rapidly and more extensively than particles which are larger and/or more dense. A modification of the suspension-polymerization method which produces very desirable results involves suspending and polymerizing a solution of the monomers in a chemically inert solvent which is immiscible with the suspending liquid and later removing the occluded or trapped solvent by leaching, drying, or distilling from the hard, polymerized particles. This process yields particles of resin which are more porous due to the escape of the solvent, and which, due to their porosity, react more readily. However, large masses or blocks of the polymer may be made and subsequently comminuted before being subjected to the haloalkylating step.

The polymerization of the vinyl compounds is accelerated by means of well-known catalysts which provide oxygen. These catalysts include ozone, organic peroxidic agents typified by ozonides, peroxides such as acetyl peroxide, lauroyl peroxide, stearoyl peroxide, tert.-butyl hydroperoxide, benzoyl peroxide, tert.-butyl perbenzoate, di-tert.-butyl diperphthalate, di-tert.-butyl peroxide, and the barium salt of tert.-butyl hydroperoxide, inorganic agents such as barium peroxide, sodium peroxide, hydrogen peroxide and the so-called "per" salts such as the water-soluble perborates, persulfates, and perchlorates. The catalysts are employed in suitable amounts ranging from 0.1% to about 2.0% based on the weight of the monomeric material to be polymerized.

The second step in the preparation of the products of this invention is one in which the insoluble, infusible, cross-linked polyvinyl hydrocarbon is haloalkylated. This step involves introducing into the polymer a plurality of bromoalkyl or, preferably, chloroalkyl groups; that is, groups having the general formula $-C_nH_{2n}-X$ as described above. While groups containing one to four carbon atoms are embraced by this invention, it is preferred to employ those compounds in which chloromethyl groups, $-CH_2Cl$, are added to the insoluble polymer, because the chloromethyl products are by far the most reactive. The carbon atoms in the group $-C_nH_{2n}X$ may be in a straight or a branched chain.

The step of haloalkylating the insoluble hydrocarbon copolymer may be carried out in a variety of ways. For example, the polymer may be reacted with a mixture of an aldehyde and hydrochloric acid or a mixture of a dihalide and a Friedel-Crafts catalyst. Methods of chloroalkylating which may be used for introducing the $-CH_2Cl$ group and which also serve as guides for introducing $-C_2H_4X$, $-C_3H_6X$, and $-C_4H_8X$ groups are described in "Organic Reactions" vol. I, chapter 3, page 63 et seq. (John Wiley & Sons, Inc., N. Y. C., 1942).

The extent of the haloalkylation reaction may be conveniently determined by a halogen analysis. It is desirable that as many haloalkyl groups as possible be introduced into the insoluble copolymer because the number of such groups determines the number of quaternary ammonium groups in the final product; and, of necessity, the number of such quaternary ammonium groups determines the ultimate capacity of the resin to adsorb anions. Although resins containing relatively few quaternary ammonium groups have some capacity for adsorbing or exchanging anions, it is necessary from a practical standpoint to add a large number of such groups in order to produce a resin of sufficiently high capacity as to be commercially attractive. The minimum number of such groups should be one for every 15 aromatic hydrocarbon nuclei in the polymer. This, of course, requires that at least one haloalkyl group be first added for every 15 aromatic hydrocarbon nuclei; and in the case of a chloromethylated copolymer of styrene and 1% divinyl benzene such a product would analyze about 2% chlorine. The upper limit is that reached when every available position in the aromatic nuclei is haloalkylated. Satisfactory resins of high capacity can be made in which the number of haloalkyl groups, and, hence, the number of quaternary ammonium groups which are introduced is less than the theoretical maximum. Thus, very valuable resins are those made by aminating, with a tertiary amine, copolymers containing from 3 to 6 haloalkyl groups for every four aromatic hydrocarbon nuclei.

The next step in the formation of the anion-exchange resin is the amination of the haloalkylated copolymer with a tertiary amine. This reaction is preferably carried out by adding the amine to the haloalkylated polymer while the latter is suspended and agitated in a liquid which is a solvent for the amine. The mixture may be allowed to react at room temperature or, preferably, at elevated temperatures, after which the resin, containing quaternary ammonium salt groups, is freed of the liquid.

It has been found to be advantageous to swell the haloalkylated polymer prior to its reaction with the tertiary amine. This swelling facilitates the subsequent amination reaction and may be carried out by soaking the polymer in a suitable liquid, the most common of which are aromatic hydrocarbons such as benzene and toluene. Frequently the volume of the polymer will increase as much as 100%, although the amount of swelling depends to a great extent upon the amount of cross-linking which has taken place during the preparation of the original polymer. In general, swelling is inversely proportional to the degree of cross-linking.

The tertiary amine is used in the form of the free base. Tertiary amines containing unsubstituted hydrocarbon substituents are operable. The hydrocarbon substituents of the amine may be alkyl groups, aryl group, cycloalkyl groups and aralkyl groups. Suitable tertiary amines are typified by the following: Trimethyl amine, triethyl and tripropyl amines, dimethyl ethyl amine, diethyl cyclohexyl amine, tricyclohexyl amine, triphenyl amine, diphenyl ethyl amine, benzyl dimethyl amine, benzyl phenyl methyl amine, and the like.

As has been stated, the products of this invention are insoluble, infusible quaternary ammonium compounds. As prepared, they are quaternary ammonium salts; but the salts may be readily converted into quaternary ammonium hydroxides by washing with an hydroxide of an alkali metal.

The following example serves to illustrate the preferred method of preparing the products of this invention.

*Example*

A. Into a one-liter, three-necked, balloon flask equipped with thermometer, mechanical stirrer, and reflux condenser was poured 400 ml. of water and 34 ml. of a 1.5% aqueous solution of magnesium silicate. Agitation was begun and a solution containing 97.5 g. of styrene, 1 g. of divinyl benzene, and 1.5 g. of ethyl styrene, with 1 g. of benzoyl peroxide dissolved therein, was added to the contents of the flask. The stirred mixture was then heated to 90° C. and held there for one and one-half hours, after which the mixture was heated at refluxing temperature for an additional one and one-half hours. The reaction mixture was then cooled to room temperature and the solid spheroids of the copolymer were separated from the liquid by decantation and filtration, air-dried, and finally oven-dried for two hours at 125° C.

In a similar manner copolymers containing higher amounts of divinyl benzene may be prepared.

B. Fifty grams of the beads of copolymer prepared in Part A above were placed in a one-liter, three-necked, balloon flask equipped with thermometer, mechanical stirrer, and reflux condenser. This amount corresponds to 0.5 mole of styrene in the form of a cross-linked copolymer. One hundred grams (1.25 moles) of chloromethyl ether, having the formula $CH_3-O-CH_2Cl$, was added and the mixture was allowed to stand at room temperature for 15 minutes during which time the beads of copolymer swelled. The mixture was then diluted with 115 ml. of petroleum ether (B. P. 30° C.–60° C.) and agitation was begun. The reaction mixture was cooled to 0° C. by means of an ice-salt bath and at this point 30 grams (0.23 mole) of anhydrous, powdered aluminum chloride was added in small portions over a period of one hour, after which the mixture was stirred at 0° C. for two hours. Then 500 ml. of ice-water was slowly added in order to decompose the excess of aluminum chloride and chloromethyl ether. The resultant mixture was stirred for 30 minutes and was filtered. The beads were first dried in air, then washed several times with water and finally dried in an oven at 125° C. for two hours.

The beads contained 21.97% chlorine by analysis.

C. In a 500 ml., three-necked, balloon flask, equipped with an agitator, reflux condenser, thermometer, and a gas-inlet tube, were placed 115 ml. of benzene and 50 grams of the chloromethylated beads prepared in Part B above. Agitation was begun and the mixture was heated to refluxing temperature and held there for 30 minutes, during which time the beads swelled. The mixture was cooled to 20° C. and was saturated with anhydrous trimethylamine gas. The mixture was then heated to 50°–55° C. and held there for four hours while a steady stream of trimethylamine was passed therethrough. The mixture was then cooled to room temperature and allowed to stand overnight, after which the beads were filtered off, washed twice with benbene, and air-dried. The dried beads, free of benzene, were then mixed with a 10% aqueous solution of sulfuric acid for two hours, after which they were washed thoroughly with water and were finally converted to the form of the quaternary ammonium hydroxide by being stirred with a 15% aqueous solution of sodium hydroxide. The final product was washed with water until the wash-water no longer gave a pink color with phenolphthalein.

The dried beads contained 5.68% nitrogen by analysis, had high capacity for adsorbing anions, and had such physical characteristics suitable for use in commercial water-treating apparatus. The beads were also capable of repeated use in adsorbing ions and being regenerated.

While other nitrogenous resins have been known heretofore which contained amino groups and were capable of removing acids from fluids, they differ markedly from the products of this invention. The latter are in fact quaternary ammonium compounds, and the resins in the form of the hydroxide are extremely strong bases which neutralize acids and split salts. Their strength is like that of an alkali-metal hydroxide, for example, sodium hydroxide; and they are believed to be the first water-insoluble, polymeric, strong, quaternary ammonium compounds. When the resins of this invention are employed, they do, in fact, exchange ions. Thus, an hydroxyl ion of the resin may be exchanged for a chloride ion, a chloride ion for a sulfate ion, and so on; and the cation of the salt is not adsorbed.

Not only do these resins reduce acidity but they are capable of removing anions per se from salt solutions as well. Thus, when a solution of sodium chloride is flowed down through a column of a resin of this invention in the hydroxyl form, the chloride ions of the salt solution are exchanged for the hydroxyl groups formerly associated with the resin, and the liquid leaves the column as a solution of sodium hydroxide. The resins may be regenerated by washing with a solution of a strong base such as sodium hydroxide. In addition to being chemically active, the resins have such physical characteristics as to be capable of repeated use and regeneration in conventional water-treating equipment. They are also characterized by the fact that they swell less during use in conventional water-treating equipment than phenolic resins in current commercial production.

I claim:

1. An insoluble, resinous, quaternary ammonium composition suitable for the removal of anions from fluids which comprises an insoluble, cross-linked copolymer of a mixture of an aromatic monovinyl hydrocarbon and an aromatic divinyl hydrocarbon, said mixture containing a predominant amount of said monovinyl hydrocarbon, said copolymer containing on the aromatic nuclei substituent groups having the general formula

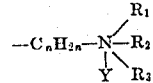

in which $n$ has a value of one to four; $R_1$, $R_2$, and $R_3$ represent monovalent hydrocarbon groups; and Y is an anion, the number of said substituent groups being at least one for every 15 aromatic nuclei in said copolymer.

2. An insoluble, resinous, quaternary ammonium composition suitable for the removal of anions from fluids which comprises an insoluble, cross-linked copolymer of a mixture of an aromatic monovinyl hydrocarbon and an aromatic divinyl hydrocarbon, said mixture containing 60% to 99.9% on a molar basis of said monovinyl hydrocarbon, said copolymer containing on the aromatic nuclei substituent groups having the general formula

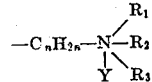

in which $n$ has a value of one to four; $R_1$, $R_2$, and $R_3$ represent monovalent hydrocarbon groups; and Y is an anion, the number of said substituent groups being three to six for every four aromatic nuclei in said copolymer.

3. An insoluble, resinous quaternary ammonium composition suitable for the removal of anions from fluids which comprises an insoluble, cross-linked copolymer of a mixture of 60% to 99.9% styrene and 40% to 0.1% divinyl benzene, said copolymer containing on the aromatic nuclei substituent groups having the general formula

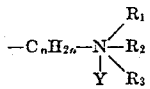

in which $n$ has a value of one to four; $R_1$, $R_2$, and $R_3$ represent monovalent hydrocarbon groups; and Y is an anion, the number of said substituent groups being at least one for every 15 benzene rings in said copolymer.

4. An insoluble, resinous quaternary ammonium composition suitable for the removal of anions from fluids which comprises an insoluble, cross-linked copolymer of a mixture of 60% to 99.9% styrene and 40% to 0.1% divinyl benzene, said copolymer containing on the aromatic nuclei substituent groups having the general formula

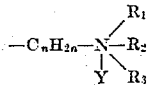

in which $n$ has a value of one to four; $R_1$, $R_2$, and $R_3$ represent monovalent hydrocarbon groups; and Y is an anion, the number of said substituent groups being from three to six for every four benzene rings in said copolymer.

5. An insoluble, resinous quaternary ammonium composition suitable for the removal of anions from fluids which comprises an insoluble, cross-linked copolymer of a mixture of 60% to 99.9% styrene and 40% to 0.1% divinyl benzene, said copolymer containing on the aromatic nuclei substituent groups having the general formula

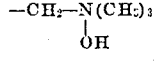

the number of such groups being from three to six for every four benzene rings in said copolymer.

6. A method of removing anions from fluids which comprises bringing said fluids into contact with the product of claim 1.

7. A method of removing anions from fluids which comprises bringing said fluids into contact with the product of claim 2.

8. A method of removing anions from fluids which comprises bringing said fluids into contact with the product of claim 3.

9. A method of removing anions from fluids which comprises bringing said fluids into contact with the product of claim 4.

10. A method of removing anions from fluids which comprises bringing said fluids into contact with the product of claim 5.

11. An insoluble, resinous quaternary ammonium composition suitable for the removal of anions from fluids which comprises an insoluble, cross-linked copolymer of a mixture of monovinyl aromatic hydrocarbon and divinyl aromatic hydrocarbon, said mixture containing 1% divinyl aromatic hydrocarbon and said copolymer containing on the aromatic nuclei substituent groups having the general formula

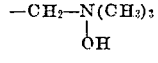

the number of such groups being from three to six for every four benzene rings in said copolymer.

12. An insoluble, resinous quaternary ammonium composition suitable for the removal of anions from fluids which comprises an insoluble, cross-linked copolymer of a mixture of styrene and divinylbenzene, said mixture containing 1% divinylbenzene and said copolymer containing on the aromatic nuclei substituent groups having the general formula

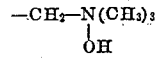

the number of such groups being from three to six for every four benzene rings in said copolymer.

13. An insoluble, resinous, quaternary ammonium composition suitable for the removal of anions from fluids, which comprises an insoluble copolymer of a mixture of an aromatic monovinyl hydrocarbon and an aromatic divinyl hydrocarbon, said mixture containing a predominant amount of said monovinyl hydrocarbon and said copolymer containing quaternary ammonium groups each linked by a single methylene group to an aromatic nucleus, the remaining valences of each nitrogen atom being satisfied by three monovalent hydrocarbon groups and an anion, the number of said substituent groups being at least one for every fifteen aromatic nuclei in said copolymer.

14. An insoluble, resinous, quaternary ammonium composition suitable for the removal of anions from fluids, which comprises an insoluble copolymer of a mixture of styrene and divinylbenzene, said mixture containing a predominant amount of styrene and said copolymer containing quaternary ammonium groups each linked by a single methylene group to an aromatic nucleus, the remaining valences of each nitrogen atom being satisfied by three monovalent hydrocarbon groups of an anion, the number of said substituent groups being at least one for every fifteen aromatic nuclei in said copolymer.

15. An insoluble, resinous, quaternary ammonium composition suitable for the removal of anions from fluids, which comprises an insoluble copolymer of a mixture of styrene and divinylbenzene, said mixture containing a predominant amount of styrene and said copolymer containing quaternary ammonium groups each linked by a single methylene group to an aromatic nucleus, the remaining valences of each nitrogen being satisfied by three methyl groups and an anion, the number of said substituent groups being at least one for every fifteen aromatic nuclei in said copolymer.

16. An insoluble, resinous, quaternary ammonium composition suitable for the removal of anions from fluids, which comprises an insoluble copolymer of a mixture of styrene and divinylbenzene, said mixture containing 1% divinylbenzene and said copolymer containing quaternary ammonium groups each linked by a single methylene group to an aromatic nucleus, the remaining valences of each nitrogen being satisfied by three methyl groups and an anion, the number of said substituent groups being at least one for every fifteen aromatic nuclei in said copolymer.

17. The process of preparing quaternary ammonium anion-exchange resins wherein a haloalkylated copolymer of a mixture of an aromatic monovinyl hydrocarbon and an aromatic divinyl hydrocarbon, said mixture containing a predominant amount of said monovinyl hydrocarbon and said copolymer containing on the aromatic nuclei substituent groups of the general formula —$C_nH_{2n}X$ in which $n$ is an integer of value one to four and X is a member of the group consisting of chlorine and bromine, is reacted with a tertiary amine whereby a polymeric quaternary ammonium salt is formed.

18. The process of preparing quaternary ammonium anion-exchange resins wherein a chloromethylated copolymer of a mixture of an aromatic monovinyl hydrocarbon and an aromatic divinyl hydrocarbon, said mixture containing a predominant amount of said monovinyl hydrocarbon and said copolymer containing on the aromatic nuclei substituent groups of the formula —$CH_2Cl$ is reacted with a tertiary amine whereby a polymeric quaternary ammonium salt is formed.

19. The process of preparing quaternary ammonium anion-exchange resins wherein a chloromethylated copolymer of a mixture of styrene and divinyl benzene, said mixture containing a predominant amount of styrene and said copolymer containing on the aromatic nuclei substituent groups of the formula —$CH_2Cl$ is reacted with a tertiary amine whereby a polymeric quaternary ammonium salt is formed.

20. The process of preparing quaternary ammonium anion-exchange resins wherein particles of an insoluble chloromethylated copolymer of an aromatic monovinyl hydrocarbon and an aromatic divinyl hydrocarbon containing a predominant amount of the aromatic monovinyl hydrocarbon and also containing on the aromatic nuclei substituent chloromethyl groups are suspended in an organic solvent for a tertiary amine which is capable of swelling the particles of insoluble copolymer and the particles are then reacted with a tertiary amine whereby a polymeric quaternary ammonium salt is formed.

21. The process of preparing quaternary ammonium anion-exchange resins wherein particles of an insoluble chloromethylated copolymer of styrene and divinyl benzene containing a predominant amount of styrene and also containing on the aromatic nuclei substituent chloromethyl groups are suspended in an organic solvent for a tertiary amine which is capable of swelling the particles of insoluble copolymer and the particles are then reacted with a tertiary amine whereby a polymeric quaternary ammonium salt is formed.

22. An insoluble resinous quaternary ammonium composition suitable for the removal of anions from fluids which comprises the reaction product of (1) a halomethylated copolymer of a major proportion of a monovinyl aromatic hydrocarbon with from 0.5 to 20.0% of a divinyl aromatic hydrocarbon, the said copolymer containing an average of from 0.2 to 1.2 halomethyl groups per aromatic nucleus, and (2) a tertiary monoamine, the amount of amine being such that there is present in the reaction mixture at least one molecular proportion of said tertiary amine for each substituent halomethyl radical in the halomethylated copolymer.

23. The process of preparing quaternary ammonium anion-exchange resins wherein a halomethylated copolymer of a mixture of an aromatic monovinyl hydrocarbon and an aromatic divinyl hydrocarbon, said mixture containing a predominant amount of said monovinyl hydrocarbon and said copolymer containing, on the aromatic nuclei, substituent halomethyl groups of the class consisting of the chloromethyl and the bromomethyl groups, is reacted with a tertiary amine having univalent hydrocarbon radicals as the organic radicals attached to the nitrogen atom of the molecule, whereby a polymeric quaternary ammonium salt is formed.

24. A method of removing anions from fluids which comprises bringing said fluids into contact with the insoluble, resinous, reaction product of a tertiary amine having univalent hydrocarbon radicals as the organic radicals attached to the nitrogen atom of the molecule, with a halomethylated copolymer of a major proportion of a monovinyl aromatic hydrocarbon and from 0.5 to 20 per cent of a divinyl aromatic hydrocarbon, which halomethylated copolymer contains, as nuclear substituents, an average of from 0.2 to 1.2 halomethyl groups per aromatic nucleus.

25. An insoluble resinous quaternary ammonium composition suitable for the removal of anions from fluids, which comprises the reaction product of (1) a haloalkylated copolymer of a mixture of an aromatic monovinyl hydrocarbon and an aromatic divinyl hydrocarbon, said mixture containing a predominant amount of said monovinyl hydrocarbon and said copolymer containing on the aromatic nuclei substituent groups of the formula —$C_nH_{2n}X$ in which $n$ is an integer of value one to four and X is a member of the group consisting of chlorine and bromine and (2) a tertiary amine.

26. An insoluble resinous quaternary ammonium composition suitable for the removal of anions from fluids, which comprises the reaction product of (1) a chloromethylated copolymer of a mixture of an aromatic monovinyl hydrocarbon and an aromatic divinyl hydrocarbon, said mixture containing a predominant amount of said monovinyl hydrocarbon and said copolymer containing on the aromatic nuclei substituent groups of the formula —$CH_2Cl$ and (2) a tertiary amine.

27. An insoluble resinous quaternary ammonium composition suitable for the removal of anions from fluids, which comprises the reaction product of (1) a chloromethylated copolymer of a mixture of styrene and divinylbenzene, said mixture containing a predominant amount of styrene and said copolymer containing on the aromatic nuclei substituent groups of the formula —$CH_2Cl$ and (2) a tertiary amine.

CHARLES H. McBURNEY.

REFERENCES CITED

The following references are of record in the file of this patent:

UNITED STATES PATENTS

| Number | Name | Date |
|---|---|---|
| 2,304,637 | Hardy | Dec. 8, 1942 |
| 2,366,007 | D'Alelio | Dec. 26, 1944 |
| 2,366,008 | D'Alelio | Dec. 26, 1944 |
| 2,388,235 | Bowman et al. | Nov. 6, 1945 |
| 2,405,806 | Albrecht et al. | Aug. 13, 1946 |